(12) United States Patent
Zhang

(10) Patent No.: US 11,056,974 B2
(45) Date of Patent: Jul. 6, 2021

(54) VOLTAGE GENERATION CIRCUIT

(71) Applicant: Shenzhen China Star Optoelectronics Semiconductor Display Technology Co., Ltd., Shenzhen (CN)

(72) Inventor: Xianming Zhang, Shenzhen (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 425 days.

(21) Appl. No.: 16/304,304

(22) PCT Filed: Sep. 20, 2018

(86) PCT No.: PCT/CN2018/106611
§ 371 (c)(1),
(2) Date: Nov. 26, 2018

(87) PCT Pub. No.: WO2020/000703
PCT Pub. Date: Jan. 2, 2020

(65) Prior Publication Data
US 2021/0119536 A1 Apr. 22, 2021

(30) Foreign Application Priority Data
Jun. 29, 2018 (CN) .......................... 201810713610.4

(51) Int. Cl.
*H02M 3/158* (2006.01)
*G05F 1/575* (2006.01)
(Continued)

(52) U.S. Cl.
CPC ............ *H02M 3/158* (2013.01); *G05F 1/575* (2013.01); *G09G 3/36* (2013.01); *H02M 3/07* (2013.01); *G09G 2330/021* (2013.01)

(58) Field of Classification Search
CPC ...... H02M 3/07; H02M 3/073; H02M 3/3156; H02M 3/158; H02M 3/1582; G09G 3/36;
(Continued)

(56) References Cited

U.S. PATENT DOCUMENTS 6,756,772 B2   6/2004 McGinnis
9,413,232 B2 * 8/2016 Torres ..................... H02M 3/07
(Continued)

FOREIGN PATENT DOCUMENTS

CN    103532382 A    1/2014
CN    107040134 A    8/2017
(Continued)

*Primary Examiner* — Matthew V Nguyen
(74) *Attorney, Agent, or Firm* — Leong C. Lei

(57) ABSTRACT

A voltage generation circuit is disclosed. The circuit includes: a buck circuit and a charge pump circuit; the buck circuit includes a second switching transistor, a second diode for freewheeling and a second inductor for storing energy, wherein a first end of the second switching transistor is connected to an input voltage, a second end is connected to a cathode of the second diode, a control end is connected with a control signal; an anode of the second diode is connected to a ground; a first end of the second inductor is connected to the cathode of the second diode, a second end is connected to a digital voltage output terminal; the cathode of the second diode is connected to the charge pump circuit, voltage on the cathode of the second diode is outputted as an auxiliary voltage for generating a reference voltage after boosted by the charge pump circuit.

8 Claims, 3 Drawing Sheets

(51) Int. Cl.
*G09G 3/36* (2006.01)
*H02M 3/07* (2006.01)

(58) Field of Classification Search
CPC ........ G09G 2330/021; G09G 2330/022; G05F 1/56; G05F 1/575
See application file for complete search history.

(56) References Cited

U.S. PATENT DOCUMENTS

| | | | |
|---|---|---|---|
| 10,686,367 B1 * | 6/2020 | Low | H02M 1/36 |
| 2008/0258701 A1 * | 10/2008 | Liu | H02M 3/1588 323/328 |
| 2014/0002046 A1 * | 1/2014 | Martin | H02M 3/155 323/282 |
| 2018/0182348 A1 * | 6/2018 | Li | G05F 3/08 |

FOREIGN PATENT DOCUMENTS

| | | | | |
|---|---|---|---|---|
| CN | 107482905 A | | 12/2017 | |
| DE | 102010013319 | * | 10/2011 | ............ H02M 3/158 |
| DE | 102016214285 A1 | | 2/2018 | |
| JP | 2009055722 | * | 3/2009 | ............. H02M 3/07 |

\* cited by examiner

VOLTAGE GENERATION CIRCUIT

FIELD OF THE INVENTION

The present invention relates to a display technology field, and more particularly to a voltage generation circuit.

BACKGROUND OF THE INVENTION

The power management circuit of the liquid crystal display device supplies various voltages such as an analog voltage AVDD, a gate-on voltage VGH, a gate-off voltage VGL, and a common electrode voltage VCOM to drive a liquid crystal display device to display an image.

The current model uses more and more panels, and its load is also increasing. It is mainly reflected in the power supply of the analog voltage AVDD. The analog voltage AVDD is the power source of the source driver, and the power source of each data voltage. The analog voltage AVDD is mostly generated by a boost circuit in a DC-DC converter circuit.

As shown in FIG. 1, it is a common circuit that generates an analog voltage AVDD. The boost circuit can perform a step-up process on the DC input voltage VIN to obtain an analog voltage AVDD, and use the energy storage characteristic of the first inductor L1 and the switching of the first switching transistor Q1 to implement voltage conversion; when the first switching transistor Q1 is closed, the first inductor L1 converts the electric energy into a magnetic energy and stores the magnetic energy. When the first switch Q1 is turned off, the first inductor L1 converts the stored magnetic energy into electric energy, and superimposed with the input voltage VIN through the first diode, and after being filtered by the first capacitor C1 and the second capacitor C2 to obtain the analog voltage AVDD. Since the analog voltage AVDD is formed by the superposition of the input voltage VIN and the magnetic energy converted by the first inductor L1 into electrical energy, the output analog voltage AVDD is higher than the input voltage VIN.

In the prior art, the reference voltage Vref for generating the gamma voltage Gamma and the common voltage VCOM in the panel is also generated from the analog voltage AVDD, as shown in FIG. 2, which is a basic logic diagram for generating a gamma voltage Gamma and a common voltage VCOM for the reference voltage Vref in the prior art. The analog voltage AVDD input LDO (low dropout linear regulator) circuit, after the LDO circuit processing, output the reference voltage Vref, the reference voltage Vref is inputted to the programmable gamma chip (P-Gamma IC), and the reference voltage is processed by the ADC module in the P-Gamma IC, generating code, and sending to the DAC module inside the P-Gamma IC. After processing by the DAC module, the gamma voltage Gamma and the common voltage VCOM are outputted.

The prior art is easily to encounter the following problem, that is, due to the serious change of the load of the analog voltage AVDD, the analog voltage AVDD has a great voltage drop and ripple. At this time, it is necessary to set a certain voltage difference between the analog voltage AVDD and the reference voltage Vref. In this case, the analog voltage AVDD is set too high, causing the source driver to be overheated.

SUMMARY OF THE INVENTION

Accordingly, it is an object of the present invention to provide a voltage generation circuit that avoids the problem of maintaining a large fixed voltage difference between the analog voltage AVDD and the reference voltage Vref.

In order to realize the above purpose, the present invention provides a voltage generation circuit, comprising: a buck circuit and a charge pump circuit; wherein the buck circuit includes a second switching transistor, a second diode for freewheeling and a second inductor for storing energy, wherein a first end of the second switching transistor is connected to an input terminal of an input voltage, a second end of the second switching transistor is connected to a cathode of the second diode, a control end of the second switching transistor is connected with a control signal; an anode of the second diode is connected to a ground; a first end of the second inductor is connected to the cathode of the second diode, a second end of the second inductor is connected to a digital voltage output terminal; the cathode of the second diode is connected to a voltage input terminal of the charge pump circuit, the voltage on the cathode of the second diode is outputted as an auxiliary voltage for generating a reference voltage after being boosted by the charge pump circuit.

Wherein the buck circuit further includes a third capacitor and a fourth capacitor, the third capacitor and the fourth capacitor are connected in parallel between the digital voltage output terminal and the ground.

Wherein the second switching transistor is a PMOS transistor, a gate electrode of the second switching transistor is connected to a control signal, a source electrode of the second switching transistor is connected to the cathode of the second diode, and a drain electrode of the second switching transistor is connected to the an input terminal of the input voltage.

Wherein the charge pump circuit is a double boost circuit.

Wherein the charge pump circuit includes a third diode, a fourth diode, a fifth diode, a sixth diode, a fifth capacitor, a sixth capacitor, a seventh capacitor, and an eighth capacitor; an anode of the third diode is connected to the ground, and a cathode of the third diode is connected to a first end of the fifth capacitor; an anode of the fourth diode is connected to the first end of the fifth capacitor, and a cathode of the fourth diode is connected to a first end of the seventh capacitor; an anode of the fifth diode is connected to the first end of the seventh capacitor, and a cathode of the fifth diode is connected to a first end of the sixth capacitor; an anode of the sixth diode is connected to a first end of the sixth capacitor, and a cathode of the sixth diode is connected to an output terminal of the auxiliary voltage; a second end of the fifth capacitor is connected to the cathode of the second diode, a second end of the sixth capacitor is connected to the cathode of the second diode, and a second end of the seventh capacitor is connected to the ground; a first end of the eighth capacitor is connected to the output terminal of the auxiliary voltage, and a second end of the eighth capacitor is connected to the ground.

Wherein the circuit further comprises a low dropout linear regulator circuit (LDO), the auxiliary voltage is inputted to the LDO to generate the reference voltage.

Wherein the circuit further comprises a controllable precision voltage stabilizing source circuit, the auxiliary voltage is inputted to the controllable precision voltage stabilizing source circuit to generate the reference voltage.

Wherein the reference voltage is inputted to a programmable gamma chip to generate a gamma voltage and a common voltage.

In summary, the voltage generation circuit of the present invention avoids the problem of maintaining a large fixed voltage difference between the analog voltage AVDD and the reference voltage Vref, and can realize a low voltage difference between the analog voltage AVDD and the reference voltage Vref, reducing power, and realizing the best temperature effect and power effect, while the stable the output of the reference voltage Vref without affecting by other signals.

BRIEF DESCRIPTION OF THE DRAWINGS

The technical solutions and other advantageous effects of the present invention will be apparent from the following detailed description of embodiments of the invention.

In the drawings.

DETAILED DESCRIPTION OF PREFERRED EMBODIMENTS

Figure 1:
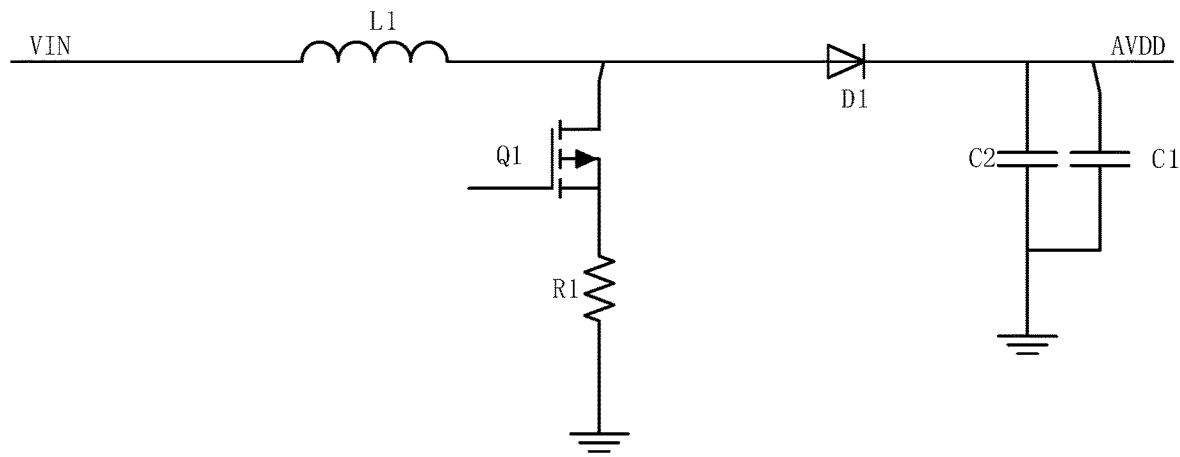
FIG. 1 is a schematic circuit diagram for generating an analog voltage AVDD in the prior art.
Figure 2:
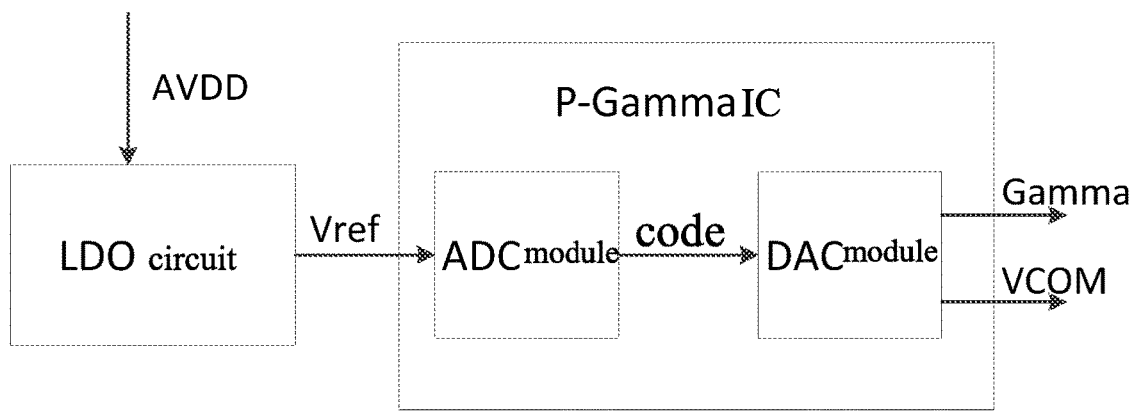
FIG. 2 is a basic logic diagram of a gamma voltage Gamma and a common voltage VCOM generated by a reference voltage Vref in the prior art.
Figure 3:
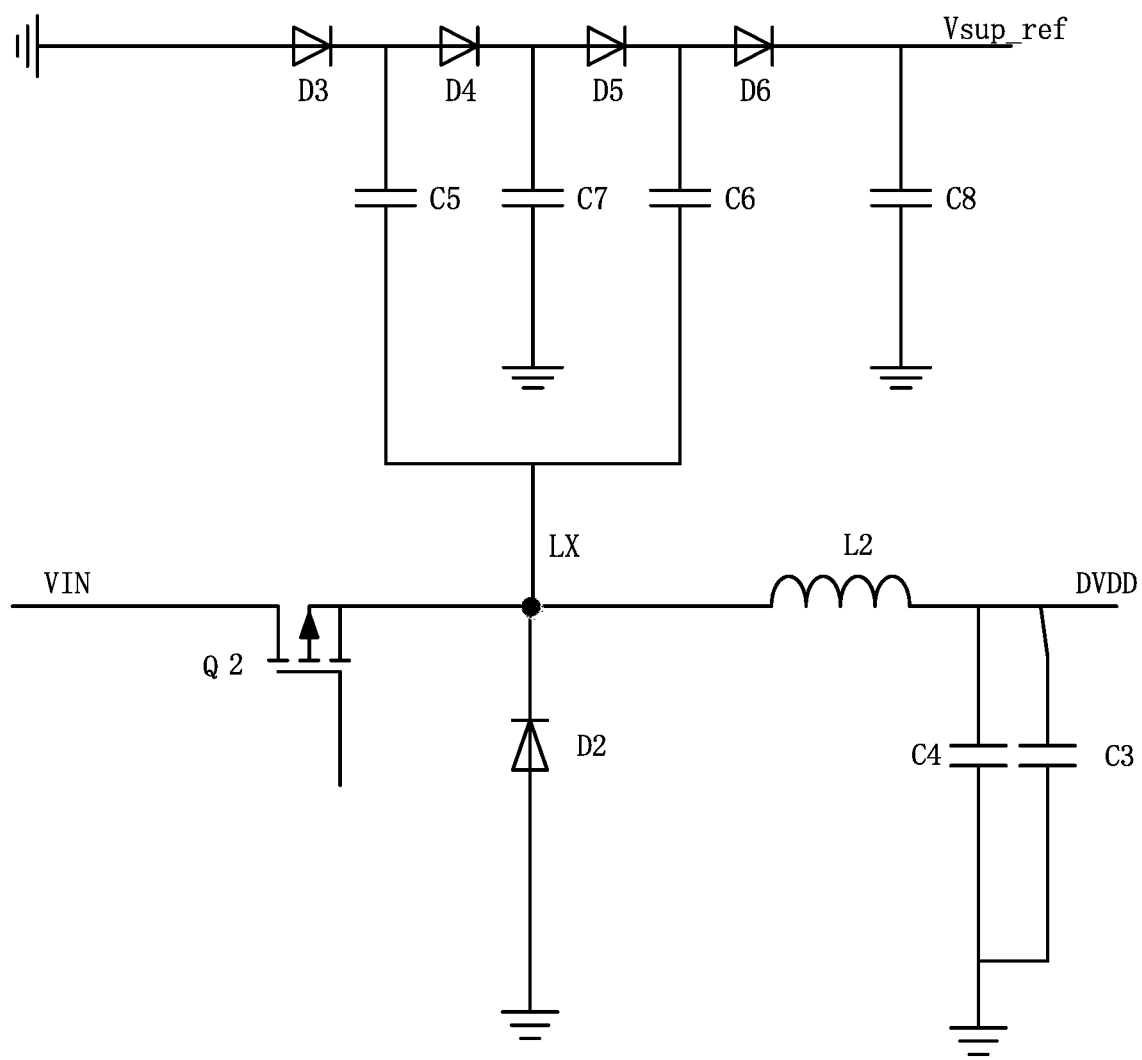
FIG. 3 is a circuit diagram of a voltage generation circuit according to a preferred embodiment of the present invention.

FIG. 3 is a circuit diagram of a preferred embodiment of a voltage generation circuit of the present invention. The circuit of the preferred embodiment mainly includes a buck circuit 1 and a charge pump circuit 2. Wherein, a cathode of a second diode D2 of the buck circuit 1, that is, a LX node, is connected to a voltage input terminal of the charge pump circuit 2, and the voltage on the LX node is outputted as an auxiliary voltage Vsup_ref for generating a reference voltage after being boosted by the charge pump circuit 2.

The buck circuit 1 mainly includes a second diode D2 for freewheeling and a second inductor L2 for storing energy, and further includes a second switching transistor Q2, a third capacitor C3 and a fourth capacitor C4. A first end of the second switching transistor Q2 is connected to an input terminal of an input voltage VIN, a second end of the second switching transistor Q2 is connected to the LX node, a control end of the second switching transistor Q2 can be connected with a control signal; an anode of the second diode D2 for freewheeling is connected to a ground, the cathode of the second diode D2 is connected to the LX node. A first end of the second inductor L2 is connected to the LX node, and a second end of the second inductor L2 is connected to an output terminal of the digital voltage DVDD; the third capacitor C3 and the fourth capacitor C4 are connected in parallel between the output terminal of the digital voltage DVDD and the ground. The second switching transistor Q2 may specifically be a PMOS transistor, a gate electrode of the second switching transistor Q2 is connected to a control signal, the source electrode of the second switching transistor Q2 is connected to the LX node, and the drain electrode of the second switching transistor Q2 is connected to the input terminal of the input voltage VIN. In the preferred embodiment, the buck circuit 1 can also be used to simultaneously output the digital voltage DVDD.

The present invention selects the voltage at the LX node of the buck circuit 1 as a signal source for generating Vsup_ref, and the voltage at the LX node is close to the input voltage VIN; by selecting the voltage at the LX node in the buck circuit 1 as the signal source for generating the auxiliary voltage Vsup_ref, the reference voltage Vref can be further generated by the auxiliary voltage Vsup_ref, avoiding the problem caused by the use of the analog voltage AVDD to generate the reference voltage Vref in the prior art. The main reason why the present invention uses the buck circuit 1 instead of other types of DC-DC conversion circuits as the signal source for generating Vsup_ref is that the output of the buck circuit is relatively stable without affecting by the blanking time.

The charge pump circuit 2 used in the preferred embodiment of the present invention is a double boost circuit, mainly comprising diodes D3~D6, capacitors C5~C8;

an anode of the third diode D3 is connected to the ground, and a cathode of the third diode D3 is connected to a first end of the fifth capacitor C5;

an anode of the fourth diode D4 is connected to the first end of the fifth capacitor C5, and a cathode of the fourth diode D4 is connected to a first end of the seventh capacitor C7;

an anode of the fifth diode D5 is connected to the first end of the seventh capacitor C7, and a cathode of the fifth diode D5 is connected to a first end of the sixth capacitor C6;

an anode of the sixth diode D6 is connected to a first end of the sixth capacitor C6, and a cathode of the sixth diode D6 is connected to an output terminal of the auxiliary voltage Vsup_ref;

a second end of the fifth capacitor C5 is connected to the LX node, a second end of the sixth capacitor C6 is connected to the LX node, and a second end of the seventh capacitor C7 is connected to the ground; a first end of the eighth capacitor C8 is connected to the output terminal of the auxiliary voltage Vsup_ref, and a second end of the eighth capacitor C8 is connected to the ground.

The preferred embodiment of the present invention utilizes the LX node of the buck circuit 1 and two peripheral dual diodes. The charge pump circuit 2 can generate an auxiliary voltage Vsup_ref which is approximately twice of the input voltage VIN. This voltage is not very accurate and will depend on the input, it will also vary depending on the size of the loading, but it is an independent voltage and much larger than the reference voltage Vref to be generated. The present invention utilizes the buck circuit 1 to provide a signal source, and the charge pump circuit 2 amplifies the signal source. Those skilled in the art can arbitrarily select the buck circuit and the charge pump circuit structure suitable for the present invention under the concept of the present invention.

The voltage generation circuit of the present invention can be further connected to a LDO circuit or the controllable precision voltage stabilizing source circuit, and the output end of the auxiliary voltage Vsup_ref of the voltage generation circuit of the present invention is connected to an input terminal of the LDO circuit or the controllable precision voltage stabilizing source circuit. The controllable precision voltage regulator source circuit uses the TL431 type controllable precision voltage regulator source. After applying the voltage generation circuit of the present invention to generate the auxiliary voltage Vsup_ref, the auxiliary voltage Vsup_ref may be further inputted to the LDO circuit or the controllable precision voltage stabilizing source circuit to generate a precise reference voltage Vref.

Figure 4:
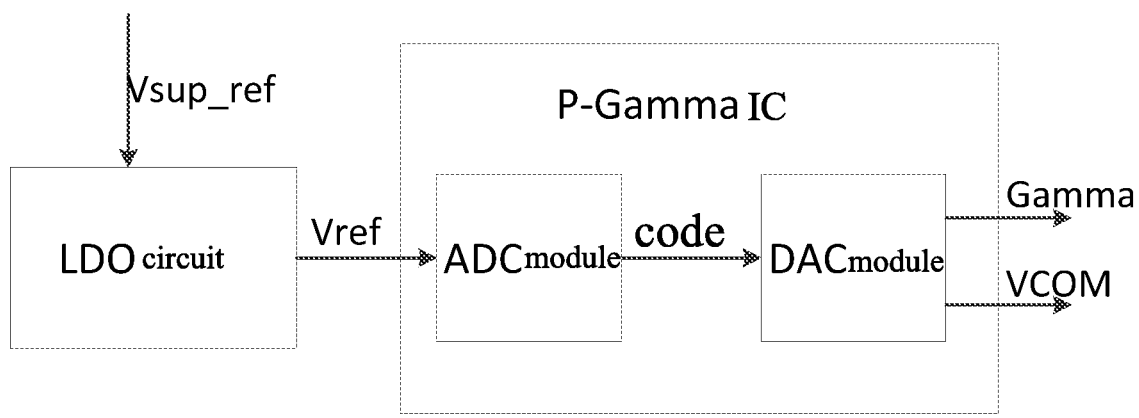
FIG. 4 is a basic logic diagram of the voltage generation circuit for generating a gamma voltage Gamma and a common voltage VCOM by applying an auxiliary voltage Vsup_ref according to the present invention.

Referring to FIG. 4, it is a basic logic diagram for generating a gamma voltage Gamma and a common voltage VCOM by applying the auxiliary voltage Vsup_ref generated by the present invention. The auxiliary voltage Vsup_ref is inputted to the LDO circuit to generate the reference voltage Vref. Since the current of the reference voltage Vref is small (within 5 mA) and the driving ability of the auxiliary voltage Vsup_ref is above 100 mA, this current does not affect the output of the reference voltage Vref, and the auxiliary voltage Vsup_ref is much greater than the reference voltage Vref, under these circumstances, a stable reference voltage Vref can be generated without being affected by a large load AVDD. The reference voltage Vref is inputted to the P-Gamma chip, processed by the ADC module in the P-Gamma chip, and codes are generated to the DAC module of the P-Gamma chip. The gamma voltage Gamma and the common voltage VCOM are output after being processed by the DAC module. At the same time, the invention does not need to change the application of the original chip (IC). On the basis of the original circuit and the chip of the liquid crystal panel, as long as a small number of peripheral circuits are added, the circuit structure is simple and the cost is low.

Based on the above voltage generation circuit, the present invention can also provide a corresponding voltage generation method, which mainly includes: connecting the LX node of the buck circuit to the charge pump circuit, and a connection node of the freewheeling diode and the energy storage inductor in the buck circuit is the LX node. The voltage on the LX node is boosted via the charge pump circuit and outputted as an auxiliary voltage Vsup_ref for generating the reference voltage Vref. The generated auxiliary voltage Vsup_ref can be inputted to the LDO circuit or the controllable precision regulated source circuit to generate the reference voltage Vref.

The generated auxiliary voltage Vsup_ref can be inputted to the LDO circuit or the controllable precision regulated source circuit to generate the reference voltage Vref. The invention adopts a method different from the prior art to generate a less accurate high voltage Vsup_ref. Although the high voltage Vsup_ref is poor in the precision, but can generate a precise reference voltage Vref through the LDO circuit or the controllable precision voltage regulator source circuit, thereby avoiding the problem of maintaining a large fixed voltage difference between the analog voltage AVDD and the reference voltage Vref.

In summary, the voltage generation circuit of the present invention avoids the problem of maintaining a large fixed voltage difference between the analog voltage AVDD and the reference voltage Vref, and can realize a low voltage difference between the analog voltage AVDD and the reference voltage Vref, reducing power, and realizing the best temperature effect and power effect, while the stable the output of the reference voltage Vref without affecting by other signals.

As described above, for those of ordinary skill in the art, various other changes and modifications can be made in accordance with the technical solutions and the technical concept of the present invention, and all such changes and modifications are intended to fall within the scope of the appended claims.

What is claimed is:

1. A voltage generation circuit, comprising:
a buck circuit and a charge pump circuit;
wherein the buck circuit includes a second switching transistor, a second diode for freewheeling and a second inductor for storing energy, wherein a first end of the second switching transistor is connected to an input terminal of an input voltage, a second end of the second switching transistor is connected to a cathode of the second diode, a control end of the second switching transistor is connected with a control signal; an anode of the second diode is connected to a ground; a first end of the second inductor is connected to the cathode of the second diode, a second end of the second inductor is connected to a digital voltage output terminal; the cathode of the second diode is connected to a voltage input terminal of the charge pump circuit, the voltage on the cathode of the second diode is outputted as an auxiliary voltage for generating a reference voltage after being boosted by the charge pump circuit; and
wherein the charge pump circuit is connected to an external voltage source that is different from the input voltage supplied to the buck circuit.

2. The voltage generation circuit according to claim 1, wherein the buck circuit further includes a third capacitor and a fourth capacitor, the third capacitor and the fourth capacitor are connected in parallel between the digital voltage output terminal and the ground.

3. The voltage generation circuit according to claim 1, wherein the second switching transistor is a PMOS transistor, a gate electrode of the second switching transistor is connected to a control signal, a source electrode of the second switching transistor is connected to the cathode of the second diode, and a drain electrode of the second switching transistor is connected to the input terminal of the input voltage.

4. The voltage generation circuit according to claim 1, wherein the charge pump circuit is a double boost circuit.

5. The voltage generation circuit according to claim 4, wherein the charge pump circuit includes a third diode, a fourth diode, a fifth diode, a sixth diode, a fifth capacitor, a sixth capacitor, a seventh capacitor, and an eighth capacitor;
an anode of the third diode is connected to the ground, and a cathode of the third diode is connected to a first end of the fifth capacitor;
an anode of the fourth diode is connected to the first end of the fifth capacitor, and a cathode of the fourth diode is connected to a first end of the seventh capacitor;
an anode of the fifth diode is connected to the first end of the seventh capacitor, and a cathode of the fifth diode is connected to a first end of the sixth capacitor;
an anode of the sixth diode is connected to a first end of the sixth capacitor, and a cathode of the sixth diode is connected to an output terminal of the auxiliary voltage; and
a second end of the fifth capacitor is connected to the cathode of the second diode, a second end of the sixth capacitor is connected to the cathode of the second diode, and a second end of the seventh capacitor is connected to the ground; a first end of the eighth capacitor is connected to the output terminal of the auxiliary voltage, and a second end of the eighth capacitor is connected to the ground.

6. The voltage generation circuit according to claim 1, wherein the circuit further comprises a low dropout linear regulator circuit (LDO), and the auxiliary voltage is inputted to the LDO to generate the reference voltage.

7. The voltage generation circuit according to claim 6, wherein the reference voltage is inputted to a programmable gamma chip to generate a gamma voltage and a common voltage.

8. The voltage generation circuit according to claim 1, wherein the circuit further comprises a controllable precision voltage stabilizing source circuit, the auxiliary voltage is inputted to the controllable precision voltage stabilizing source circuit to generate the reference voltage.

* * * * *